United States Patent Office 3,557,095
Patented Jan. 19, 1971

3,557,095
PYRAZOLODIAZEPINONE COMPOUNDS
Horace A. De Wald, Ann Arbor, Mich., assignor to Parke, Davis & Company, Detroit, Mich., a corporation of Michigan
No Drawing. Filed May 31, 1968, Ser. No. 733,243
Int. Cl. C07d 53/02
U.S. Cl. 260—239.3                                                6 Claims

ABSTRACT OF THE DISCLOSURE

Pyrazolo[4,3-e][1,4]diazepin-5(1H)-one compounds, substituted in the 1-position by lower alkyl or allyl, in the 3-position by methyl or ethyl, in the 8-position by phenyl or o-chlorophenyl, and optionally in the 4-position by methyl; salts thereof; and their production by (a) reacting a 4-amino-5-aroylpyrazole with a lower alkyl ester of glycine or a salt thereof, (b) reacting a 5-aroyl-4-(2-haloacetamido)pyrazole or a salt thereof with ammonia, (c) reacting a 4-(2-aminoacetamido) 5-aroyl-pyrazole salt with a base, and (d) reacting one of the 4-unsubstituted pyrazolodiazepinones with a methylating agent in the presence of a base to produce one of the 4-methyl pyrazolodiazepinones. The compounds of the invention are useful anticonvulsant and anti-anxiety agents.

SUMMARY AND DETAILED DESCRIPTION

The present invention relates to new heterocyclic nitrogen compounds that are useful as pharmacological agents and to methods for their production. More particularly, the invention relates to new pyrazolodiazepinone compounds having the formula

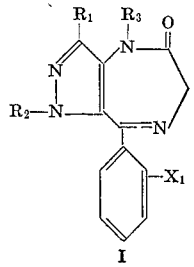

I and to pharmaceutically-acceptable salts thereof; where $R_1$ is methyl or ethyl, $R_2$ is an alkyl group having fewer than 4 carbon atoms or allyl, $R_3$ is hydrogen or methyl, and $X_1$ is hydrogen or chlorine.

In accordance with the invention pyrazolodiazepinone compounds having the foregoing formula are produced by reacting a 4-amino-5-aroylpyrazole compound having the formula

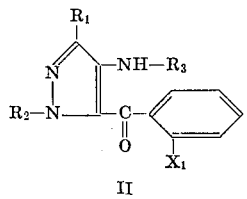

II with a lower alkyl ester of glycine; where each of $R_1$, $R_2$, $R_3$, and $X_1$ is as defined above. The glycine ester may be used in either free base or acid-addition salt form, with the acid-addition salt form being preferred. The individual preferred glycine ester salt is glycine ethyl ester hydrochloride. The reaction is preferably carried out in the presence of a basic catalyst in a basic solvent medium. Suitable catalysts for this purpose are various aliphatic, aromatic, and heterocyclic secondary amines, such as diethylamine, dipropylamine, N-methylaniline, N-ethyl-aniline, piperidine, pyrrolidine, and mixtures of these. The preferred catalyst is piperidine. Suitable solvents are various tertiary amines, such as triethylamine, tributylamine, N,N-dimethylaniline, pyridine, quinoline, and mixtures of these. Pyridine is a preferred solvent. The temperature and duration of the reaction are not critical and may be varied widely, the temperature from 50 to 150° C. and the duration from one to about 48 hours. In the preferred pyridine solvent, the reaction is conveniently carried out at the reflux temperature of the reaction mixture and at that temperature is essentially complete after about 16 to 30 hours. Although equivalent quantities of reactants may be employed, best results are obtained with a moderate to large excess of the glycine ester. The amount of secondary amine used as catalyst is not critical.

The 4-amino-5-aroylpyrazole compounds having Formula II above that are required as starting materials in the foregoing process can be prepared by a variety of methods. A general procedure for the preparation of the 4-amino-5-benzoylpyrazoles, that is, the compounds of Formula II wherein both $R_3$ and $X_1$ are hydrogen, is the following. The ethyl ester of a 2,4-dioxoalkanoic acid having the formula

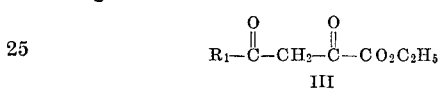

III is reacted with hydrazine to give a pyrazole-5-carboxylic acid ester having the formula

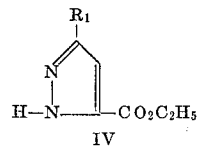

IV which in turn is reacted with an alkylating agent, such as an alkyl or allyl halide, sulfate, or hydrocarbon sulfonate, to introduce an alkyl or allyl group into the 1-position, giving a pyrazole-5-carboxylic acid ester compound having the formula

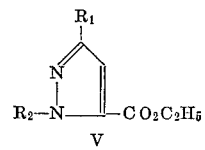

V

This ester intermediate is hydrolyzed to give the corresponding free carboxylic acid, which is then reacted with nitric acid in sulfuric acid to give a 4-nitropyrazole-5-carboxylic acid having the formula

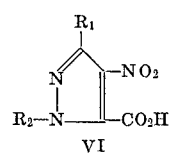

VI

This intermediate is next reacted with a halogenating agent, such as thionyl chloride or phosphorous pentachloride, and the 4-nitropyrazole-5-carbonyl chloride intermediate that is obtained is reacted with aluminum chloride and benzene to give a 5-benzoyl-4-nitropyrazole having the formula

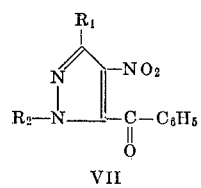

VII which is finally reacted with an appropriate reducing agent to reduce the nitro group and give the desired 4-amino-5-benzoylpyrazole starting material having the formula

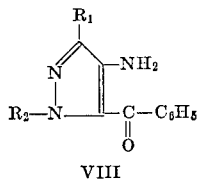
VIII

These starting materials, as well as the 4-amino-5-(o-chlorobenzoyl)pyrazoles, can also be prepared by the following modification of the above procedure. The 4-nitropyrazole-5-carboxylic acid compound of Formula VI is reduced, for example by reaction with sodium hydrosulfite, to give the corresponding 4-aminopyrazole-5-carboxylic acid, which in turn is reacted with acetic anhydride to give a pyrazolo[4,3-d]-[1,3]oxazin-7-(1H)-one having the formula

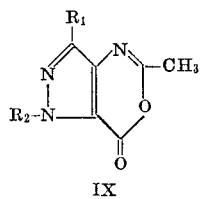
IX

This pyrazolooxazinone intermediate is then reacted with phenylmagnesium bromide or o-chlorophenylmagnesium bromide and the reaction product hydrolyzed to give a 4-acetamido-5-aroylpyrazole having the formula

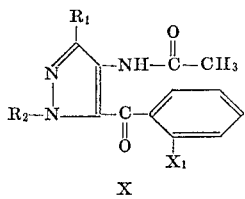
X which is finally hydrolyzed by reaction with hydrochloric acid to remove the acetyl group and give the desired 4-amino-5-aroylpyrazole starting material having the formula

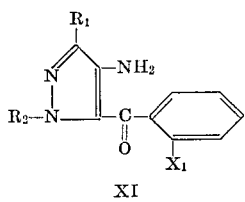
XI

The 5-aroyl-4-(N-methylamino)pyrazole starting materials can be prepared as follows. The 4-amino-4-aroylpyrazole of Formula XI above is reacted with p-toluenesulfonyl chloride to give the corresponding 5-aroyl-4-(p-toluene-sulfonamido)pyrazole, and this intermediate is reacted with a methylating agent, such as methyl iodide, in the presence of a base to give the corresponding 4-aroyl-4-(N-methyl-p-toluenesulfonamido)pyrazole intermediate having the formula

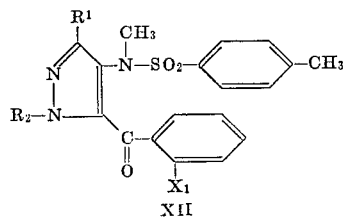
XII which is reacted with sodium naphthalide in an ethereal solvent to remove the p-toluenesulfonyl group and give the desired 5-aroyl-4-(N-methylamino)pyrazole starting material having the formula

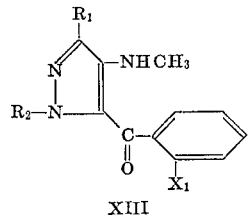
XIII

The foregoing procedures, as well as certain modifications thereof, are described in detail hereinafter for the preparation of individual compounds. In Formulas III to XIII, the symbols $R_1$, $R_2$, and $X_1$ have the same meaning as previously given.

Also in accordance with the invention, pyrazolodiazepinone compounds having Formula I above are produced by reacting a 5-aroyl-4-(2-haloacetamido)pyrazole compound having the formula

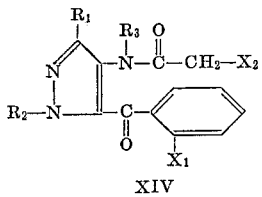
XIV or a salt thereof, with ammonia; where $R_1$, $R_2$, $R_3$, and $X_1$ have the aforementioned significance, and $X_2$ is bromine, chlorine, or iodine, and preferably, bromine. The reaction is best carried out in an unreactive solvent medium. Suitable solvents include lower alkanols, such as methanol, ethanol, and 2-propanol; tertiary amides, such as N,N-dimethylacetamide and N-methyl-2-pyrrolidinone; ethers, such as dioxane, tetrahydrofuran, and 1,2-dimethoxyethane; and halogenated hydrocarbons, such as methylene chloride, chloroform, and carbon tetrachloride; as well as mixtures of these. Excess liquid anhydrous ammonia can also be used as solvent. A preferred solvent is methanol. The temperature is not critical and may be varied from —40 to 100° C., with a temperature in the range of from 15 to 30° C. being preferred. The duration of the reaction is likewise not critical, and at a temperature in the preferred range, the reaction is essentially complete after about 12 to 18 hours. For best results, a large excess of ammonia is employed.

The 5-aroyl-4-(2-haloacetamido)pyrazole compounds and salts thereof, used above as starting materials, are prepared by reacting a 4-amino-5-aroylpyrazole compound having Formula II above with a haloacetyl halide compound having the formula

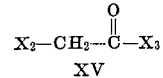
XV where $X_2$ is as defined earlier and $X_3$ is bromine or chlorine.

Further in accordance with the invention, pyrazolodiazepinone compounds having Formula I above are produced by reacting a 4-(2-aminoacetamido)-5-aroylpyrazole salt compound having the formula

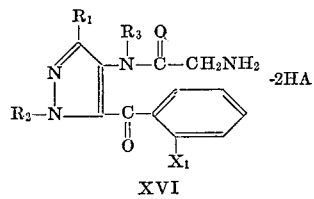
XVI with a sufficient amount of base to neutralize the salt, whereupon the free base 4-(2-aminoacetamido)-5-aroylpyrazole that is liberated undergoes cyclization to give a pyrazolodiazepinone compound of the invention; where $R_1$, $R_2$, $R_3$, and $X_1$ have the same meaning as previously given and A represents one equivalent of an anion. The reaction is best carried out in a solvent medium, which may be water or an aqueous lower alkanol. Any of a number of bases may be used, including alkali metal carbonates and bicarbonates, such as sodium carbonate, potassium carbonate, and sodium bicarbonate; alkali metal hydroxides, such as sodium hydroxide and potassium hydroxide; and alkaline earth metal hydroxides, such as magnesium hydroxide. The preferred base is an aqueous alkali metal hydroxide. A large excess of the base is normally used since the cyclization reaction proceeds most rapidly when the reaction mixture is strongly alkaline. The temperature is not critical and the reaction can conveniently be carried out at room temperature, that is, without external heating or cooling. The duration of the reaction is dependent upon the amount of base employed, but the progress of the reaction can readily be followed by means of ultraviolet spectroscopy. An ultraviolet spectrum of the 4-(2-aminoacetamido)-5-aroylpyrazole salt starting material in solution shows an absorption maximum at about 260 m$\mu$; as this starting material is converted to the pyrazolodiazepinone product, this maximum disappears and is replaced by a maximum at about 300 m$\mu$, when observed in acidic solution.

The 4-(2-aminoacetamido)-5-aroylpyrazole salt compounds required as starting materials in the foregoing process are prepared in a number of ways. For example, the dihydrobromide salts, which are the preferred starting materials, are prepared by reacting a 4-amino-5-aroylpyrazole compound having Formula II above with N-(carbobenzoxy)glycine in the presence of N,N'-dicyclohexylcarbodiimide to give a 5-aroyl-4-[2-carbobenzoxyamino)acetamido]pyrazole compound having the formula

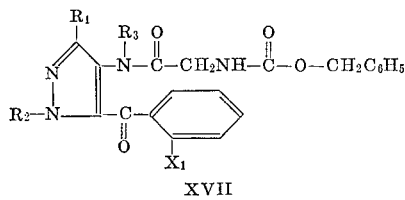

XVII which is then reacted with hydrogen bromide in acetic acid to give the desired dihydrobromide salt starting material (Formula XVI, A=Br). Other salts, if desired, can then be obtained from the dihydrobromide by anion exchange on a suitable ion exchange resin.

Further yet in accordance with the invention, pyrazolodiazepinone compounds having the formula

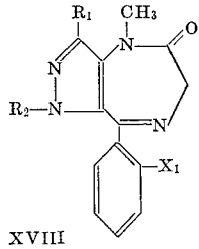

XVIII are produced by reacting a pyrazoldiazepinone compound having the formula

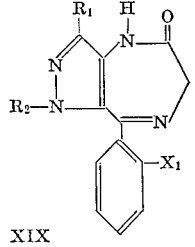

XIX with a methylating agent in the presence of a base; where $R_1$, $R_2$, and $X_1$ have the same meaning as previously given. Examples of methylating agents that may be used are a methyl halide, especially methyl iodide, methyl sulfate, and a methyl hydrocarbon sulfonate, such as methyl methanesulfonate and methyl p-toluenesulfonate. Bases that may be used include alkali metal hydrides, such as sodium hydride and lithium hydride, alkali metal amides, such as sodamide and potassium amide, and alkali metal alkoxides. Of these, sodium hydride is preferred. The reaction is best carried out in an unreactive solvent medium, which may be a tertiary amide, such as N,N-dimethylformamide, N,N-dimethylacetamide, and N-methyl-2-pyrrolidinone; an ether, such as diethyl ether, tetrahydrofuran, and dioxane; an aromatic hydrocarbons, such as benzene and toluene; dimethylsulfoxide; and mixtures of these. Preferred solvents are N,N-dimethylformamide and dimethylsulfoxide. The temperature and duration of the reaction are not critical and may be varied widely, the temperature from 0 to 100° and the duration from one to about 48 hours. The reaction can conveniently be carried out at room temperature, that is, without external heating or cooling, and at that temperature is essentially complete after about 4 hours but may optionally be continued for up to 16 hours to insure completeness. Equimolar quantities of reactants and base may be employed, although a slight excess of any one is not harmful. For optimum yields, it is desirable to use a slight excess of both the methylating agent and base.

The compounds of the invention can exist in the free form having Formula I above or in the form of an acid-addition salt. Pharmaceutically-acceptable acid-addition salts are formed by reaction of the free pyrazolodiazepinone compounds with any of a number of inorganic acids, including hydrochloric, hydrobromic, hydriodic, nitric, sulfuric, phosphoric, and with certain strong organic acids, such as methanesulfonic, benzenesulfonic, and p-toluenesulfonic.

The free pyrazolodiazepinone compounds of Formula I where $R_3$ is hydrogen also form pharmaceutically-acceptable salts by reaction with a strong base. Suitable strong bases for this purpose include alkali metal hydroxides, such as sodium hydroxide, potassium hydroxide, and lithium hydroxide; alkali metal hydrides, such as sodium hydride; alkali metal alkoxides; and alkaline earth metal hydroxides.

The free pyrazolodiazepinone compounds and their salts may differ somewhat in certain physical properties, such as solubility in polar solvents, but they are otherwise equivalent for purposes of the invention.

The compounds of the invention are new chemical compounds that are useful as pharmacological agents. As such, they exert a depressant effect upon the central nervous system that is shown by their ability to prevent the occurrence of convulsions in laboratory animals following the administration of pentamethylenetetrazole and also by their ability to overcome inhibited behavior in animals placed in any anxiety-producing situation.

The anticonvulsant activity of the compounds of the invention is measured in a standard test that is carried out essentially as described by Chen et al., A.M.A. Archives of Neurology and Psychiatry, vol. 66, pp. 329–337 (1951), and vol. 68, pp. 498–505 (1952), and by Chen et al., Journal of Pharmacology and Experimental Therapeutics, vol. 103, pp. 54–61 (1951). In this test, each of a group of five rats is given a measured oral dose of a test compound, dissolved in water or suspended with acacia, followed 30 minutes later by a subcutaneous dose of 93 mg./kg. of pentamethylenetetrazole. This quantity of pentamethylenetetrazole quickly produces convulsions in 98–100% of untreated control rats. The treated animals are then observed visually for 30 minutes following administration of pentamethylenetetrazole, and anticonvulsive activity is judged by noting the time of onset and severity of clonic convulsive seizures and the number of animals completely protected from convulsions. The activity of a test compound at each dosage level is rated as follows: 4+, protection of all five rats; 3+, protection of 3 or 4 rats; 2+, protection of 1 or 2 rats; 1+, delay in onset; 0, no effect.

The results obtained for some representative compounds of the present invention when tested by the foregoing procedure are shown in the following table. The compounds in the table are identified by reference to the examples that follow, where the preparation of each is described.

ANTICONVULSANT ACTIVITY

| Compound: | Dose, mg./kg. | Rating |
|---|---|---|
| Example 1 | 32 | 4+ |
|  | 16 | 4+ |
|  | 8 | 4+ |
|  | 4 | 0-1+ |
| Example 2 | 32 | 4+ |
|  | 16 | 4+ |
|  | 8 | 4+ |
|  | 4 | 4+ |
|  | 2 | 0 |
| Example 3(a) | 63 | 4+ |
|  | 32 | 3-4+ |
|  | 16 | 1+ |
|  | 8 | 0 |
| Example 7 * | 63 | 4+ |
|  | 32 | 4+ |
|  | 16 | 2-3+ |
|  | 8 | 0 |

*Administered as the hydrochloride salt.

The anti-anxiety activity of the compounds of the invention is determined in a test that measures food consumption by rats that have been placed in an anxiety-producing situation. In this test, newly arrived Holtzman male albino rats are allowed to adjust to the laboratory environment for at least three days before use. When tested, the animals are experimentally naive, are under no condition of dietary deprivation, and weigh about 230 grams. After adjustment to the normal laboratory environment, each of a group of eight rats is given a measured dose of test compound, dissolved in water or suspended in 0.2% aqueous methocel, by oral intubation and is immediately placed in an individual metabolism cage. A 30-minute period is allowed for absorption of the test compound. Each animal is then given access to a milk preparation in a graduated and calibrated tube. The preparation consists of one part sweetened condensed milk and two parts water. The total milk intake of each animal after one and two hours is recorded and compared with that of a group of eight untreated control animals. The animals are also observed for any gross behavioral signs and symptoms. Greater than normal ingestion of milk by the treated animals is regarded as an indication that the test compound, by acting upon the inhibitory brain systems, has suppressed the natural tendency of rodents to become immobilized in a novel, anxiety-producing situation, as represented in the test by the isolation of the metabolism cage. A given dose of test compound is considered active if it causes a mean amount of ingestion greater than 5.0 ml. per animal at the end of the first hour of the test. During this same period, the untreated controls normally consume between 2.0 and 4.0 ml. of milk.

The anti-anxiety activities of some representative compounds of the present invention, as determined by the foregoing procedure, are shown in the following table, where the compounds again are identified by reference to the examples that follow. The table also shows the results obtained for diazepam and chlordiazepoxide, which are known to be clinically useful for the treatment of anxiety states. The demonstration of activity for diazepam and chlordiazepoxide indicates the validity of the test procedure for determining anti-anxiety activity.

ANTI-ANXIETY ACTIVITY

| Compound | Dose, mg./kg. | Milk intake after 1 hour, ml. |
|---|---|---|
| Example 1 | 40 | 5.8 |
|  | 20 | 5.2 |
|  | 10 | 5.9 |
|  | 5 | 4.8 |
|  | 2.5 | 3.8 |
|  | 1.25 | 2.6 |
| Example 2 | 40 | 12.0 |
|  | 20, | 13.5 |
|  | 10 | 13.2 |
|  | 5 | 8.5 |
|  | 2.5 | 7.4 |
|  | 1.25 | 4.6 |
| Example 3(c) | 40 | 9.1 |
|  | 20 | 6.9 |
|  | 10 | 6.0 |
|  | 5 | 5.6 |
|  | 2.5 | 4.8 |
| Example 7* | 40 | 6.2 |
|  | 20 | 5.8 |
|  | 10 | 3.3 |
| Diazepam | 40 | 10.7 |
|  | 20 | 12.1 |
|  | 10 | 7.4 |
|  | 5 | 7.1 |
|  | 2.5 | 8.0 |
| Chlordiazepoxide | 40 | 10.7 |
|  | 20 | 11.4 |
|  | 10 | 8.1 |
|  | 5 | 4.7 |

*Administered as the hydrochloride salt.

The compounds of the invention are preferably administered orally, as indicated above, although parenteral administration can also also be used. They can be combined with either a solid or liquid carrier or diluent and made available in varying amounts in such pharmaceutical forms as tablets, capsules, powders, and aqueous and non-aqueous suspensions and solution.

In addition to the pyrazolodiazepinone compounds having Formula I and their salts, the 4-(2-aminoacetamido)-5-aroylpyrazole salt compounds having Formula XVI above have also been found to possess anticonvulsant and anti-anxiety activities, as determined by the test procedures described above.

The invention is illustrated by the following examples.

Example 1

A mixture consisting of 9.0 g. of 4-amino-5-benzoyl-1,3-dimethylpyrazole, 18.0 g. of glycine ethyl ester hydrochloride, 2.0 ml. of piperidine, and 100 ml. of pyridine is stirred and heated under reflux for 30 hours and then evaporated to dryness under reduced pressure. The residue is shaken with a mixture of 250 ml. of methylene chloride and 100 ml. of water, and the methylene chloride phase is separated, treated with charcoal and anhydrous magnesium sulfate, filtered, and evaporated under reduced pressure to give 4,6-dihydro - 1,3 - dimethyl-8-phenylpyrazolo[4,3-e][1,4]diazepin - 5(1H)-one; M.P. 267–270° C., following crystallization from ethanol.

The free base product (2.5 g.) is dissolved in 15 ml. of ethanolic hydrogen chloride, the resulting solution is cooled, and the 4,6-dihydro - 1,3 - dimethyl-8-phenylpyrazolo[4,3-e][1,4]diazpin - 5 - (1H) - one hydrochloride that precipitates is isolated and crystallized from chloroform-methanol-ether; M.P. 295° C.

Example 2

A mixture consisting of 4.4 g. of 4-amino-5-benzoyl-1-ethyl-3-methylpyrazole, 8.0 g. of glycine ethyl ester hydrochloride, 1.0 ml. of piperidine, and 35 ml. of pyridine is stirred and heated under reflux for 30 hours and then evaporated to dryness under reduced pressure. To the residue is added 50 ml. of water and the aqueous mixture is extracted with 125 ml. of methylene chloride. The methylene chloride extract is treated with charcoal and anhydrous magnesium sulfate, filtered, and evaporated to give 1-ethyl - 4,6 - dihydro-3-methyl-8-phenylpyrazolo[4,3-e][1,4]diazepin-5(1H)-one, M.P. 217–219° C., following crystallization from 95% ethanol.

The sulfate salt is prepared as follows. The above product (1.3 g.) is dissolved in 40 ml. of 0.5 N sulfuric acid, and the solution is subjected to lyophilization. The solid obtained is dissolved in 7 ml. of warm methanol, and the methanol solution is treated with 7 ml. of ethyl acetate and then with enough ether to effect the precipitation of solid 1-ethyl-4,6-dihydro - 3 - methyl-8-phenylpyrazolo[4,3-e][1,4]diazepin-5(1H)-one sulfate, which is isolated and dried; M.P. 265–268° C. (with decomposition).

The methanesulfonate salt is obtained by treating a solution of 0.8 g. of 1-ethyl-4,6-dihydro-3-methyl-8-phenylpyrazolo[4,3-e][1,4]diazepin-5(1H) - one in 10 ml. of warm toluene with 0.3 g. of methanesulfonic acid and then adding sufficient dry ether to bring about the crystallization of the desired salt; M.P. 265° C.

The sodium salt is obtained as follows. 1-ethyl-4,6-dihydro-3-methyl - 8 - phenylpyrazolo[4,3-e][1,4]diazepin-5(1H)-one (5.2 g.) is stirred with 40 ml. of 0.5 N sodium hydroxide, the resulting mixture is filtered, and the filtrate is subjected to lyophilization. The solid residue is dissolved in 25 ml. of hot N,N-dimethylformamide, and the solution is filtered, cooled and treated with about 90 ml. of anhydrous ether to precipitate 1-ethyl-4,6-dihydro-3-methyl-8-phenylpyrazolo[4,3-e][1,4]diazepin-5(1H)one, sodium salt, monohydrate; M.P.>300° C. (darkens at 295° C.).

Example 3

Utilizing the general procedure described in Examples 1 and 2 above, with only minor variations in duration of heating and isolation technique, the following pyrazolodiazepinone compounds are obtained from the reactions indicated.

(a) 4,6-dihydro-1-isopropyl-3-methyl-8-phenylpyrazolo[4,3-e][1,4]diazepin-5(1H)-one, M.P. 201–203° C., following crystallization from toluene; from reaction of 10 g. of 4-amino-5-benzoyl-1-isopropyl-3-methylpyrazole with 18 g. of glycine ethyl ester hydrochloride in a mixture of 2.0 ml. of piperidine and 100 ml. of pyridine.

(b) 1-allyl-4,6-dihydro-3-methyl - 8 - phenyl-pyrazolo[4,3-e][1,4]diazepin-5(1H)-one; from reaction of 18 g. of 1-allyl-4-amino-5-benzoyl-3-methylpyrazole with 21 g. of glycine ethyl ester hydrochloride in a mixture of 3.0 ml. of piperidine and 200 ml. of pyridine.

(c) 3-ethyl-4,6-dihydro-1-methyl - 8 - phenylpyrazolo[4,3-e][1,4]diazepin - 5(1H)-one, M.P. 236–239° C., following crystallization from toluene; from reaction of 23 g. of 4-amino-5-benzoyl-3-ethyl-1-methylpyrazole with 28 g. of glycine ethyl ester hydrochloride in a mixture of 4.7 ml. of piperidine and 205 ml. of pyridine.

(d) 1,3-diethyl-4,6-dihydro-8 - phenylpyrazolo[4,3-e]-[1,4]diazepin-5(1H)-one, M.P. 212–215° C., following crystallization from toluene; from reaction of 16 g. of 4-amino-5-benzoyl-1,3-diethylpyrazole with 19 g. of glycine ethyl ester hydrochloride in a mixture of 3.2 ml. of piperidine and 140 ml. of pyridine.

(e) 1-ethyl-4,6-dihydro-3-methyl - 8 - (o-chlorophenyl)-pyrazolo[4,3-e][1,4]diazepin-5(1H) - one; from reaction of 5.5 g. of 4-amino - 5 - (o-chlorobenzoyl)-1-ethyl-3-methylpyrazole with 8.0 g. of glycine ethyl ester hydrochloride in a mixture of 1.0 ml. of piperidine and 35 ml. of pyridine.

(f) 1-ethyl-4,6 - dihydro-3,4 - dimethyl - 8 - phenyl-pyrazolo[4,3-e][1,4]diazepin-5(1H) - one, M.P. 99–102° C., following several crystallizations from cyclohexane with charcoal treatment; from reaction of 4.0 g. of 5-benzoyl-1-ethyl-3-methyl - 4 - (N-methylamino)pyrazole with 8.0 g. of glycine ethyl ester hydrochloride in a mixture of 1.0 ml. of piperidine and 35 ml. of pyridine.

The hydrobromide salt of 4,6 - dihydro - 1 - isopropyl-3-methyl-8-phenylpyrazolo[4,3-e][1,4]diazepin - 5(1H)-one (see (a) above) is prepared by treating a solution of 0.2 g. of the free base product in 3 ml. of glacial acetic acid with 1.0 ml. of a 20% solution of hydrogen bromide in glacial acetic acid, cooling the resulting mixture, and isolating the solid salt that precipitates; M.P. 305° C. (with decomposition).

Example 4

A stirred solution of 8.6 g. of 4-amino-5-benzoyl-1,3-dimethylpyrazole in 100 ml. of ether at room temperature is treated five times as follows: 1.0 ml. of bromoacetyl bromide is added, and the resulting mixture is stirred for five minutes and then washed with 150 ml. of water. After the fifth treatment the reaction mixture is washed with water until neutral, and the resulting ether solution is dried and evaporated to dryness under reduced pressure. The residue, which is 5-benzoyl - 4-(2-bromoacetamido)-1,3-dimethylpyrazole, is dissolved in 100 ml. of methanol and to the solution is added 250 ml. of a 15% ammonia in methanol solution. The resulting mixture is kept at room temperature for 16 hours, evaporated to dryness under reduced pressure, and the residue is shaken with a mixture of 100 ml. of methylene chloride and 100 ml. of water. The methylene chloride phase is separated, dried, and evaporated to give 4,6-dihydro-1,3-dimethyl-8 - phenylpyrazolo[4,3-e][1,4]diazepin-5(1H)-one, M.P. 267–270° C., following crystallization from ethanol.

Example 5

To a solution of 13 g. of 4-amino-5-benzoyl-1-ethyl-3-methylpyrazole in 250 ml. of ethyl acetate, heated under reflux, is added dropwise 22 g. of bromoacetyl bromide, and the resulting mixture is heated under reflux for one hour. After standing at room temperature overnight, there is obtained a solid precipitate of 5-benzoyl-4-(2-bromoacetamido)-1-ethyl - 3 - methylpyrazole hydrobromide, which is isolated, washed with ethyl acetate and with ether, and crystallized from isopropyl alcohol-ether; M.P. 220–224° C. This hydrobromide salt intermediate is dissolved in 100 ml. of methanol, and to the solution is added 250 ml. of a 15% ammonia in methanol solution. The resulting mixture is kept at room temperature for about 16 hours, evaporated to dryness, and the residue is shaken with a mixture of 100 ml. of methylene chloride and 100 ml. of water. The methylene chloride phase is separated, dried, and evaporated to give 1-ethyl-4,6-dihydro-3-methyl - 8 - phenylpyrazolo[4,3-e][1,4]diazepin-5(1H)-one, M.P. 217–219° C., following crystallization from 95% ethanol.

Example 6

A solution of 20 g. of 4-(2-aminoacetamido)-5-benzoyl-1-ethyl-3-methylpyrazole dihydrobromide in 100 ml. of water at room temperature is made strongly alkaline by the addition of 50% aqueous sodium hydroxide, and the resulting mixture is extracted several times with methylene chloride. The combined extracts are washed with water, dried, and evaporated under reduced pressure to give 1-ethyl-4,6-dihydro-3-methyl-8-phenylpyrazolo[4,3 - e][1,4] diazepin-5(1H)-one; M.P. 217–219° C., following crystallization from 95% ethanol.

Utilizing the foregoing procedure, with the substitution of 8.0 g. of 4-(2-aminoacetamido)-5-benzoyl-1,3-dimethylpyrazole dihydrobromide in 50 ml. of water for the 4-(2-aminoacetamido)-5-benzoyl-1-ethyl-3-methylpyrazole dihydrobromide in 100 ml. of water, there is obtained 4,6-dihydro-1,3-dimethyl-8 - phenylpyrazolo[4,3-e][1,4]diazepin-5(1H)-one; M.P. 267–270° C., following crystallization from 95% ethanol.

Example 7

To a stirred mixture of 1.0 g. of 50% sodium hydride in mineral oil dispersion and 35 ml. of N,N-dimethylformamide at room temperature is added in portions 5.0 g. of 4,6-dihydro-1,3-dimethyl-8-phenylpyrazolo[4,3 - e][1,4]diazepin-5(1H)-one. The resulting mixture is stirred for 30 minutes, 3.0 ml. of dimethyl sulfate is added, and stirring is continued for 16 hours at room temperature. The reaction mixture is then poured into 200 ml. of water and the aqueous mixture is extracted with methylene chloride. The methylene chloride extract is washed with water, dried, and evaporated under reduced pressure to give 4,6-dihydro-1,3,4-trimethyl-8 - phenylpyrazolo[4,3 - e][1,4]diazepin-5(1H)-one. This free base product is dissolved in excess isopropanolic hydrogen chloride and the solution is treated with sufficient ether to effect the crystallization of 4,6-dihydro-1,3,4-trimethyl-8-phenylpyrazolo[4,3 - e][1,4]diazepin-5(1H) - one monohydrochloride monohydrate; M.P. 213–215° C.

Example 8

To a stirred mixture of 4.4 g. of 55% sodium hydride in mineral oil dispersion in 50 ml. of dimethyl sulfoxide at room temperature is carefully added a solution of 27 g. of 1-ethyl-4,6-dihydro-3-methy-8-phenylpyrazolo[4,3-e][1,4]diazepin-5(1H)-one in 125 ml. of dimethylsulfoxide, and the resulting mixture is stirred for 45 minutes more. Methyl iodide (14.5 g.) is added, and the reaction mixture is stirred for about 2 hours and is then poured into 700 ml. of water. The aqueous mixture is extracted several times with ether, and the ether extract is washed well with water, dried, and evaporated to dryness to give 1-ethyl-4,6-dihydro-3,4-dimethyl - 8 - phenylpyrazolo[4,3 - e][1,4] diazepin-5(1H)-one; M.P. 99–102° C., following several crystallizations from cyclohexane with charcoal treatment.

Example 9

To a stirred mixture of 1.0 g. of 50% sodium hydride in mineral oil dispersion and 40 ml. of N,N-dimethylformamide at room temperature is added in portions 5.6 g. of 4,6-dihydro-1-isopropyl-3-methyl-8-phenylpyrazolo[4,3-e][1,4]diazepin-5-(1H)-one. The resulting mixture stirred for 30 minutes, 3.5 g. of methyl iodide is added, and stirring at room temperature is continued for 16 hours more. The mixture is then poured into 250 ml. of water, and the aqueous mixture is extracted with methylene chloride. The extract is washed with water, dried, and evaporated to give 4,6 - dihydro - 1 - isopropyl-3,4-dimethyl-8-phenylpyrazolo[4,3-e][1,4]diazepin-5(1H) - one; M.P. 145–147° C., following crystallization from toluene-petroleum ether.

Utilizing the foregoing procedure, the following pyrazolodiazepinone compounds are obtained from the reactions indicated:

(a) 1-allyl-4,6-dihydro-3,4-dimethyl-8 - phenylpyrazolo[4,3-e][1,4]diazepin-5(1H)-one; from reaction of 5.6 g. of 1-allyl-4,6-dihydro-3-methy-8-phenylpyrazolo[4,3 - e][1,4]diazepin-5(1H)-one, 1.0 g. of 50% sodium hydride in mineral oil dispersion, and 3.5 g. of methyl iodide in 40 ml. of N,N-dimethylformamide.

(b) 3-ethyl-4,6-dihydro-1,4-dimethyl-8 - phenylpyrazolo[4,3-e][1,4]diazepin-5(1H)-one, M.P. 91–93° C., following crystallization from ether; from reaction of 9.0 of 3-ethyl - 4,6-dihydro-1-methyl-8-phenylpyrazolo[4,3-e][1,3]diazepin-5(1H)-one, 1.5 g. of 50% sodium hydride in mineral dispersion, and 4.9 g. of methyl iodide in 40 ml. of dimethylsulfoxide.

(c) 1-ethyl-4,6-dihydro-3,4-dimethyl-8 - (o - chlorophenyl)-pyrazolo[4,3-e][1,4]diazepin-5(1H) - one; from reaction of 6.0 g. of 1-ethyl-4,6-dihydro-3-methyl-8-(o-chlorophenyl)pyrazolo[4,3-e][1,4]diazepin-5(1H) - one, 1.0 g. of 50% sodium hydride in mineral oil dispersion, and 3.5 g. of methyl iodide in 40 ml. of N,N-dimethylformamide.

STARTING MATERIALS

The various starting materials and intermediates employed in the foregoing examples are prepared by the methods described in the following.

(A) 4-nitropyrazole-5-carboxylic acids (1) 1,3-dimethyl-4-nitropyrazole-5-carboxylic acid. To a stirred mixture of 40 ml. of 90% nitric acid and 65 g. of fuming sulfuric acid (23% sulfur trioxide) is added in portions, at such a rate so as to maintain the temperature at about 70° C., 37 g. of 1,3-dimethylpyrazole-5-carboxylic acid. (For the preparation of this and related compounds see Chemische Berichte, vol. 59, page 606, 1926.) After addition is complete, the mixture is heated at 95–100° C. for 3 hours, cooled, and poured into ice water. The solid 1,3-dimethyl-4-nitropyrazole-5-carboxylic acid that precipitates is isolated, washed with ice water, and dried; M.P. 166–167° C., following crystallization from water.

(2) 1-ethyl-3-methyl-4-nitropyrazole-5-carboxylic acid, M.P. 157–160° C., following crystallization from ethyl acetate; obtained by the method of (1) above from the reaction of 29 g. of 1-ethyl-3-methylpyrazole-5-carboxylic acid with a mixture of 35 ml. of 90% nitric acid and 60 g. of fuming sulfuric acid (23% sulfur trioxide).

(3) 1-isopropyl-3-methyl-4-nitropyrazole-5-carboxylic acid, M.P. 158–160° C.; obtained by the method of (1) above from the nitration of 1-isopropyl-3-methylpyrazole-5-carboxylic acid. (For the preparation of this last-named compound and related compounds, see Archiv der Pharmazie, vol. 281, page 178, 1943.)

(4) 3-ethyl-1-methyl-4-nitropyrazole-5-carboxylic acid. Anhydrous hydrazine (19.9 g.) is added, dropwise with cooling by means of an ice bath, to a stirred solution of 100 g. of 2,4-dioxohexanoic acid ethyl ester in 250 ml. of glacial acetic acid. The cooling bath is removed, and the reaction mixture is heated under reflux overnight and then distilled under reduced pressure to give 3-ethylpyrazole-5-carboxylic acid, ethyl ester; B.P. 125–132° C./0.3 mm. Hg.

A mixture of 71 g. of 3-ethylpyrazole-5-carboxylic acid, ethyl ester and 27.7 g. of dimethyl sulfate is heated, first to 95° C. for 30 min. and then to 160° C., cooled to about 100° C., and added with stirring to a solution of 74 g. of 50% aqueous sodium hydroxide in 190 ml. of water. The alkaline mixture is heated on a steam bath for one hour, cooled, and acidified by treatment with 50 ml. of concentrated hydrochloric acid. The solid 3-ethyl-1-methylpyrazole-5-carboxylic acid monohydrate that precipitates is isolated, washed with saturated aqueous sodium chloride and with cold water, and dried; M.P. 132–135° C., following crystallization from chloroform-petroleum ether.

To a stirred mixture of 46 ml. of 90% nitric acid and 143 g. of fuming sulfuric acid (23% sulfur trioxide) is added in portions over 30 minutes 65 g. of 3-ethyl-1-methylpyrazole-5-carboxylic acid, and the resulting mixture is heated on a steam bath for 2.5 hours. It is then cooled and poured onto 200 g. of ice. The solid 3-ethyl-1-methyl-4-nitropyrazole-5-carboxylic acid that precipitates is isolated, washed with saturated aqueous sodium chloride and with cold water, and dried; M.P. 120–123° C., following crystallization from ethyl acetate-petroleum ether.

(5) 1,3-diethyl-4-nitropyrazole-5-carboxylic acid. A solution of 83 g. of 3-ethylpyrazole-5-carboxylic acid, ethyl ester in 65 ml. of methylene chloride is added rapidly to a solution of 90 g. of triethyloxonium fluoborate in 300 ml. of methylene chloride, and the resulting mixture is stirred at room temperature for 4.5 hours. It is then cooled in an ice bath while approximately 250 ml. of 10% aqueous sodium hydroxide is added. The methylene chloride layer is separated, washed with water, dried, evaporated, and the residue distilled to give 1,3- diethylpyrazole-5-carboxylic acid, ethyl ester, B.P. 54–65° C./0.2 mm. Hg.

To a solution of 96 g. of 1,3-diethylpyrazole-5-carboxylic acid, ethyl ester in 260 ml. of 95% ethanol is added a solution of 35 g. of potassium hydroxide in 61 ml. of water, and the resulting mixture is stirred and heated under reflux for 2 hours, cooled, and concentrated to remove ethanol. To the concentrate is added 260 ml. of water, and the aqueous mixture is cooled and acidified with 70 ml. of concentrated hydrochloric acid. After further cooling, the solid 1,3-diethylpyrazole-5-carboxylic acid that precipitates is isolated, washed with cold water, and dried; M.P. 100–102° C. This 1,3-diethylpyrazole-5-carboxylic acid intermediate product (61 g.) is nitrated by reaction with a mixture of 40 ml. of 90% nitric acid and 122 g. of fuming sulfuric acid, according to the nitration procedure described in (4) above, to give the desired 1,3-diethyl-4-nitropyrazole-5-carboxylic acid, M.P. 132–135° C.

(B) 4-amino-1-ethyl-3-methylpyrazole-5-carboxylic acid

To a stirred solution of 35 g. of 1-ethyl-3-methyl-4-nitropyrazole-5-carboxylic acid in 300 ml. of water at 75° C. is added in portions 120 g. of sodium hydrosulfite at such a rate so as to maintain the temperature at 75–80° C. The resulting mixture is then stirred at room temperature for 3 hours more, cooled to 0–5° C., and the solid 4-amino-1-ethyl-3-methyl-pyrazole-5-carboxylic acid that precipitates is isolated, washed with ice water, and dried; M.P. 210° C. (with decomposition).

(C) 5-aroyl-4-nitropyrazoles (1) 5-benzoyl-1,3-dimethyl-4-nitropyrazole. A mixture consisting of 18.5 g. of 1,3-dimethyl-4-nitropyrazole-5-carboxylic acid, 14.5 g. of thionyl chloride, 2.0 ml. of N,N-dimethylformamide, and 150 ml. of toluene is stirred and heated at 95° C. for 2 hours, then cooled and poured into 150 ml. of ice water. The aqueous mixture is stirred for 10 minutes an the toluene layer is separated, washed with 100 ml. of 10% aqueous potassium carbonate, dried, and evaporated. The residue, which is 1,3-dimethyl-4-nitropyrazole-5-carbonyl chloride, is dissolved in 30 ml. of benzene and the solution is added to a suspension of 15 g. of powdered anhydrous aluminum chloride in 150 ml. of benzene. The reaction mixture is stirred and heated under reflux for 3 hours, cooled, and poured into 150 ml. of ice water. The benzene layer is separated, washed with water and with 100 ml. of 1 N aqueous sodium hydroxide, dried and evaporated to give 5-benzoyl-1,3-dimethyl-4-nitropyrazole; M.P. 63–65° C., following crystallization from ethyl acetate-petroleum ether.

(2) 5-benzoyl-1-ethyl-3-methyl-4-nitropyrazole, M.P. 52° C., following crystallization from ethyl acetate-petroleum ether; obtained by the method of (1) above from the reaction of 30 g. of 1-ethyl-3-methyl-4-nitropyrazole-5-carboxylic acid with 20 g. of thionyl chloride in the presence of 3.0 ml. of N,N-dimethylformamide in 200 ml. of toluene to give 1-ethyl-3-methyl-4-nitropyrazole-5-carbonyl chloride, and the subsequent reaction of this acid chloride intermediate with 27 g. of powdered ankydrous aluminum chloride in 220 ml. of benzene.

(3) 5-benzoyl-1-isopropyl-3-methyl-4-nitropyrazole. A mixture of 40 g. of 1-isopropyl-3-methyl-4-nitropyrazole-5-carboxylic acid and 39.2 g. of phosphorus pentachloride is heated at 95–100° C. for one hour and then kept at room temperature for about 16 hours. It is next diluted with 200 ml. of benzene, and the benzene solution is poured into 250 ml. of water. The aqueous mixture is stirred vigorously for 15 minutes, and the benzene phase is separated, washed several times with saturated aqueous sodium chloride and with 10% aqueous potassium carbonate, dried, and evaporated to give a residue of 1-isopropyl-3-methyl - 4 - nitropyrazole-5-carbonyl chloride, which is purified by distillation; B.P. 79–85° C./0.3 mm. Hg. This acid chloride intermediate (30 g.) is reacted with 18 g. of powdered anhydrous aluminum chloride in 235 ml. of benzene, according to the method of (1) above, to give the desired 5-benzoyl-1-isopropyl-3-methyl-4-nitropyrazole, B.P. 148–153° C./0.3 mm. Hg.

(4) 5-benzoyl - 3-ethyl-1-methyl-4-nitropyrazole, M.P. 57–59° C., following crystallization from ethyl acetate-petroleum ether; obtained by the method of (3) above from the reaction of 41 g. of 3-ethyl-1-methyl-4-nitropyrazole-5-carboxylic acid with 43 g. of phosphorus pentachloride to give 3-ethyl-1-methyl-4-nitropyrazole-5-cabonyl chloride, B.P. 94–97° C./0.3 mm. Hg, and the subsequent reaction of this acid chloride intermediate (34 g.) with 21 g. of anhydrous aluminum chloride in 293 ml. of benzene.

(5) 5-benzoyl-1,3-diethyl-4-nitropyrazole, M.P. 63–65° C., following crystallization from ethyl acetate-petroleum ether; obtained by the method of (3) above from the reaction of 31 g. of 1,3-diethyl-4-nitropyrazole-5-carboxylic acid with 30.5 g. of phosphorus pentachloride to give 1,3-diethyl-4-nitropyrazole-5-carbonyl chloride, B.P. 112–115° C./0.3 mm. Hg, and the subsequent reaction of this acid chloride intermediate (28 g.) with 17 g. of anhydrous aluminum chloride in 222 ml. of benzene.

(D) 4-amino-5-aroylpyrazoles (1) 4-amino-5-benzoyl-1,3-diemthylpyrazole. A mixture consisting of 10.0 g. of 5-benzoyl-1,3-dimethyl-4-nitropyrazole, 0.5 g. of Raney nickel, and 100 ml. of methanol is shaken with hydrogen at an initial pressure of 50 lbs./in.$^2$ until three molecular equivalents of hydrogen are taken up. The catalyst is then removed by filtration, and the filtrate is evaporated under reduced pressure to give 4-amino-5-benzoyl-1,3-dimethylpyrazole, isolated as an oil that is suitable for use without further purification. The hydrochloride salt, M.P. 192° C., is prepared by treating the free base in isopropyl alcohol with excess hydrogen chloride, adding ether to the resulting mixture, cooling, and isolating the precipitated salt.

(2) 4-amino-5-benzoyl-1-ethyl-3-methylpyrazole, an oil suitable for use without further purification (hydrochloride salt, monohydrate, M.P. 175–177° C.); obtained by the method of (1) above from the hydrogenation of 26 g. of 5-benzoyl-1-ethyl-3-methyl-4-nitropyrazole in the presence of 0.5 g. of Raney nickel in 150 ml. of methanol.

(3) 4 - amino-5-benzoyl-1-isopropyl-3-methylpyrazole, an oil suitable for use without further purification (hydrochloride salt, M.P. 203° C., with decomposition); obtained by the method of (1) above from the hydrogenation of 20 g. of 5-benzoyl-1-isopropyl-3-methyl-4-nitropyrazole in the presence of 5 g. of Raney nickel in 125 ml. of methanol and 125 ml. of tetrahydrofuran.

(4) 4-amino-5-benzoyl-3-ethyl-1-methylpyrazole. To a stirred mixture of 56 g. of 5-benzoyl-3-ethyl-1-methyl-4-nitropyrazole, 59.5 g. of iron powder, 380 ml. of 95% ethanol, and 152 ml. of water is added all at once 4.9 ml. of concentrated hydrochloric acid, and the resulting mixture is stirred at room temperature for 30 minutes and then stirred and heated under reflux for one hour. After cooling, the mixture is filtered with the aid of diatomaceous silica, and the filtrate is evaporated to dryness. The residue is diluted with ether, the ethereal mixture is filtered, and the filtrate is washed with 1 N sodium hydroxide and with saturated aqueous sodium chloride, dried, treated with charcoal, and evaporated to dryness. The residue is distilled under reduced pressure to give the desired 4-amino-5-benzoyl-3-ethyl-1-methylpyrazole, B.P. 143–147° C./0.3 mm. Hg.

(5) 4-amino-5-benzoyl-1,3-diethylpyrazole, an oil collected at B.P. 156–205° C./0.3–0.5 mm. Hg (hydrochloride salt, M.P. 170–173° C.); obtained by the method of (1) above from the hydrogenation of 51.6 g. of 5-benzoyl-1,3-diethyl-4-nitropyrazole in the presence of 6 g. of Raney nickel in 450 ml. of tetrahydrofuran and 150 ml. of methanol.

(6) 1-allyl-4-amino-5-benzoyl-3-methylpyrazol. To a stirred solution of 41 g. of 1-allyl-3-methylpyrazole-5-carboxylic acid in 250 ml. of glacial acetic acid, at room temperature, is added dropwise 80 g. of bromine, and the resulting mixture is kept at room temperature for 5 hours and then evaporated. The residue obtained is dissolved in chloroform, and the solution is washed with dilute aqueous sodium bisulfite and with water, dried, and evaporated to give 4-bromo-1-(2,3-dibromopropyl)-3-methylpyrazole-5-carboxylic acid; M.P. 84–86° C., following crystallization from aqueous ethanol.

To a solution of 100 g. of 4-bromo-1-(2,3-dibromopropyl)-3-methylpyrazole-5-carboxylic acid in 600 ml. of 95% ethanol is added 40 g. of granulated zinc, and the resulting mixture is stirred and heated under reflux for 10 minutes, cooled, and filtered. The filtrate is evaporated and the residue is shaken with a mixture of 300 ml. of 2 N hydrochloric acid and 400 ml. of warm (40° C.) chloroform. The chloroform phase is separated, washed with saturated aqueous sodium chloride, dried and evaporated to give 1-allyl-4-bromo-3-methylpyrazole-5-carboxylic acid, M.P. 138–140° C., following crystallization from chloroform-petroleum ether.

To an ethereal solution of phenyl lithium (prepared from 56 g. of bromobenzene and 4.9 g. of lithium in 250 ml. of ether), cooled to 5° C., in a nitrogen atmosphere, is added a solution of 37 g. of 1-allyl-4-bromo-3-methylpyrazole-5-carboxylic acid in 150 ml. of ether, and the resulting mixture is stirred at room temperature for 16 hours. Water (100 ml.) is added with continued stirring, and the ethereal phase is separated, washed with dilute aqueous sodium hydroxide and with water, dried, and evaporated to give 1-allyl-5-benzoyl-4-bromo-3-methylpyrazole.

A mixture of 28.5 g. of 1-allyl-5-benzoyl-4-bromo-3-methylpyrazole and 100 g. of anhydrous ammonia is heated at 150–160° C. in a sealed vessel for 4 hours. Upon cooling, the excess ammonia is allowed to evaporate, and the residue is dissolved in methylene chloride. The solution is washed with dilute aqueous sodium hydroxide and with saturated aqueous sodium chloride, dried, and evaporated to give the desired 1-allyl-4-amino-5-benzoyl-3-methylpyrazole.

(7) 4 - amino - 5 - (o-chlorobenzoyl)-1-ethyl-3-methylpyrazole. A solution of 17 g. of 4-amino-1-ethyl-3-methylpyrazole-5-carboxylic acid in 150 ml. of acetic anhydride is heated under reflux for 2 hours and then evaporated under reduced pressure. The residue of 1-ethyl-3,5-dimethylpyrazolo[4,3-d][1,3]oxazin-7(1H)-one is dissolved in 50 ml. of tetrahydrofuran and 100 ml. of benzene, and to the solution, cooled to 5° C., is added dropwise with stirring over a period of 2 hours an ethereal solution of o-chlorophenylmagnesium bromide (prepared from 4.8 g. of magnesium and 38 g. of 1-bromo-2-chlorobenzene in 100 ml. of ether). The reaction mixture is stirred at room temperature for 16 hours and then treated with excess dilute hydrochloric acid. The organic layer is separated, washed with dilute aqueous sodium carbonate, dried, and evaporated. The residue, which is 4-acetamido-5-(o-chlorobenzoyl)-1-ethyl-3-methylpyrazole, is dissolved in 150 ml. of ethanol, to the solution is added 150 ml. of 6 N hydrochloric acid, and the resulting mixture is heated under reflux for 3 hours, treated with charcoal and evaporated to dryness. The solid residue, which is the hydrochloride salt of 4 - amino - 5-(o-chlorobenzoyl)-1-ethyl-3-methylpyrazole, is dissolved in water and the aqueous solution is made alkaline with aqueous sodium carbonate and extracted with methylene chloride. The extract is washed with water, dried, and evaporated to give the desired 4-amino-5-(o-chlorobenzoyl)-1-ethyl-3-methylpyrazole, isolated as an oil that is suitable for use without further purification.

(E) 4-(2-aminoacetamido)-5-aroylpyrazole salts (1) 4 - (2-aminoacetamido)-5-benzoyl-1-ethyl-3-methylpyrazole dihydrobromide. A mixture consisting of 18 g. of 4-amino-5-benzoyl-1-ethyl-3-methylpyrazole, 15 g. of N-(carbobenzoxy)glycine, 16 g. of N,N'-dicyclohexylcarbodiimide, and 300 ml. of ethyl acetate is stirred and heated under reflux for 16 hours, cooled, and filtered. The filtrate is washed with dilute aqueous sodium carbonate and with dilute hydrochloric acid, dried, and evaporated to give 5 - benzoyl-4-[2-(carbobenzoxyamino)acetamido]-1-ethyl-3-methylpyrazole, M.P. 91–93° C., following crystallization from ethyl acetate-petroleum ether.

A solution of 20 g. of 5-benzoyl-4-[2-(carbobenzoxyamino)acetamido]-1-ethyl-3-methylpyrazole in 200 ml. of a 20% hydrogen bromide in acetic acid solution is kept at room temperature for 2 hours, poured into 1000 ml. of ether, and the solid 4-(2-aminoacetamido)-5-benzoyl-1-ethyl-3-methylpyrazole dihydrobromide that precipitates is isolated, washed with ether, dried, and crystallized from isopropyl alcohol-ethyl acetate; M.P. 203–205° C. (with decomposition).

(2) 4 - (2 - aminoacetamido) - 5-benzoyl-1,3-dimethylpyrazole dihydrobromide, M.P. 230° C. (with decomposition), following crystallization from isopropyl alcohol-ethyl acetate; obtained by the method of (1) above from the reaction of 4.2 g. of 4-amino-5-benzoyl-1,3-dimethylpyrazole with 3.7 g. of N-(carbobenzoxy)glycine and 4.2 g. of N,N'-dicyclohexylcarbodiimide in 100 ml. of ethyl acetate to give 5-benzoyl-4-[2-(carbobenzoxyamino)acetamido]-1,3-dimethylpyrazole, M.P. 112–114° C., following crystallization from ethyl acetate-petroleum ether, and the subsequent reaction fo this intermediate with hydrogen bromide in acetic acid.

(F) 5-benzoyl-1-ethyl-3-methyl-4-(N-methylamino) pyrazole

A mixture consisting of 9.2 g. of 4 - amino - 5-benzoyl-1-ethyl-3-methylpyrazole, 8.5 g. of p-toluenesulfonyl chloride, and 150 ml. of pyridine is stirred and heated under reflux for 90 minutes, evaporated under reduced pressure, cooled, and diluted with 300 ml. of ice water. After 2.5 hours at room temperature the solid 5 - benzoyl - 1 - ethyl-3-methyl-4-(p-toluenesulfonamido) pyrazole that precipitates is isolated, washed with water and dried.

To a stirred mixture of 2.0 g. of 50% sodium hydride in mineral oil dispersion and 30 ml. of N,N-dimethylformamide at room temperature is added in portions 13.5 g. of 5-benzoyl-1-ethyl-3-methyl-4-(p-toluenesulfonamido) pyrazole. The resulting mixture is stirred for 30 minutes, 8.8 g. of dimethylsulfate is added dropwise, and stirring is continued at room temperature for 2 hours. The mixture is then concentrated under reduced pressure, diluted with ethyl acetate, and the ethyl acetate solution is washed with water, with 1 N sodium hydroxide, and with saturated aqueous sodium chloride, dried, evaporated, and the residue triturated with petroleum ether to give 5-benzoyl-1 - ethyl - 3 - methyl - 4-(N-methyl-p-toluenesulfonamido) pyrazole.

A mixture consisting of 2.3 g. of sodium, 13 g. of naphthalene, and 150 ml. of 1,2-dimethoxyethane is stirred under nitrogen at room temperature for 90 minutes, and to the resulting solution is added a solution of 12 g. of 5 - benzoyl - 1 - ethyl-3-methyl-4-(N-methyl-p-toluenesulfonamido)pyrazole in about 100 ml. of 1,2-dimethoxyethane. The mixture is stirred at room temperature for 2 hours and is then cautiously treated with about 35 ml. of water and diluted with an equal volume of ethyl acetate. The aqueous phase is discarded and the organic phase is washed with saturated aqueous sodium chloride and extracted with 200 ml. of 1 N hydrochloric acid. The acidic aqueous extract is made strongly alkaline with 30% aqueous sodium hydroxide, and the alkaline mixture is extracted with ether. The ether extract is washed with water, dried, and evaporated to give the desired 5-benzoyl-1-ethyl-3-methyl-4-(N-methylamino)pyrazole, isolated as an oil that is suitable for use without further purification.

I claim:
1. A member of the class consisting of pyrazolodiazepinone compounds having the formula

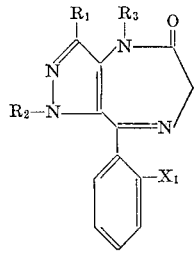

and pharmaceutically-acceptable salts thereof; where $R_1$ is a member of the class consisting of methyl and ethyl, $R_2$ is a member of the class consisting of an alkyl group having fewer than 4 carbon atoms and allyl, $R_3$ is a member of the class consisting of hydrogen and methyl, and $X_1$ is a member of the class consisting of hydrogen and chlorine.

2. A compound according to claim 1 which is 4,6-dihydro - 1,3 - dimethyl - 8 - phenylpyrazolo[4,3-e][1,4]diazepin-5(1H)-one.

3. A compound according to claim 1 which is 1-ethyl-4,6 - dihydro - 3 - methyl - 8 - phenylpyrazolo[4,3-e][1,4]diazepin-5(1H)-one.

4. A compound according to claim 1 which is 3-ethyl-4,6 - dihydro - 1 - methyl - 8 - phenylpyrazolo[4,3-e][1,4]diazepin-5(1H)-one.

5. A compound according to claim 1 which is 1-ethyl-4,6 - dihydro - 3,4 - dimethyl - 8 - phenylpyrazolo[4,3-e][1,4]diazepin-5(1H)-one.

6. A compound according to claim 1 which is 4,6-dihydro - 1,3,4 - trimethyl - 8 - phenylpyrazolo[4,3-e][1,4]diazepin-5(1H)-one.

References Cited
UNITED STATES PATENTS
3,371,085  2/1968  Reeder et al. _____ 260—239.3

HENRY R. JILES, Primary Examiner
R. T. BOND, Assistant Examiner

U.S. Cl. X.R.
424—273; 260—244, 310